US008199850B2

(12) United States Patent (10) Patent No.: US 8,199,850 B2
Krueger et al. (45) Date of Patent: Jun. 12, 2012

(54) TRANSMITTER FOR COMMUNICATION SYSTEMS EMPLOYING AN ENHANCED MODULATION SCHEME

(75) Inventors: Martin Krueger, Munich (DE); Holger Neuhaus, Munich (DE); Burkhard Becker, Ismaning (DE)

(73) Assignee: Intel Mobile Communications GmbH, Neubiberg (DE)

( * ) Notice: Subject to any disclaimer, the term of this patent is extended or adjusted under 35 U.S.C. 154(b) by 787 days.

(21) Appl. No.: 12/018,380

(22) Filed: Jan. 23, 2008

(65) Prior Publication Data

US 2008/0181326 A1 Jul. 31, 2008

(30) Foreign Application Priority Data

Jan. 30, 2007 (EP) .................................. 07002011

(51) Int. Cl.
*H04L 27/00* (2006.01)
(52) U.S. Cl. ....................................................... 375/295
(58) Field of Classification Search .................. 375/295, 375/298, 308
See application file for complete search history.

(56) References Cited

U.S. PATENT DOCUMENTS 6,134,273 A * 10/2000 Wu et al. ........................ 375/261
2005/0143004 A1* 6/2005 Dibiaso et al. ............... 455/12.1

FOREIGN PATENT DOCUMENTS

EP 1 361 686 A1 11/2003
EP 1 528 742 A2 5/2005

OTHER PUBLICATIONS

"System Performance with Higher Level Modulation in the GSM/EDGE Radio Access Network", Mathias Eriksson, Dalibor Turina, Hüseyin Arslan, Kumar Balachandran and Jung-Fu Cheng, IEEE Global Telecommunications Conference, San Antonio, Nov. 25-29, 2001, pp. 3065-3069.

* cited by examiner

*Primary Examiner* — Kevin M Burd
(74) *Attorney, Agent, or Firm* — Eschweiler & Associates, LLC

(57) ABSTRACT

A transmitter is configured to transmit a transmit signal modulated according to a first modulation scheme, the first modulation scheme being associated with a set of first constellation points. The transmitter transmits at least a part of the transmit signal based on a subset of the first constellation points, wherein the subset of first constellation points approximates second constellation points of a set of second constellation points associated with a second modulation scheme. The first and second modulation schemes are different from one another.

19 Claims, 6 Drawing Sheets

3π/8-(8,8)-APK

5π/12-(12,4)-APK

π/4-16-QAM

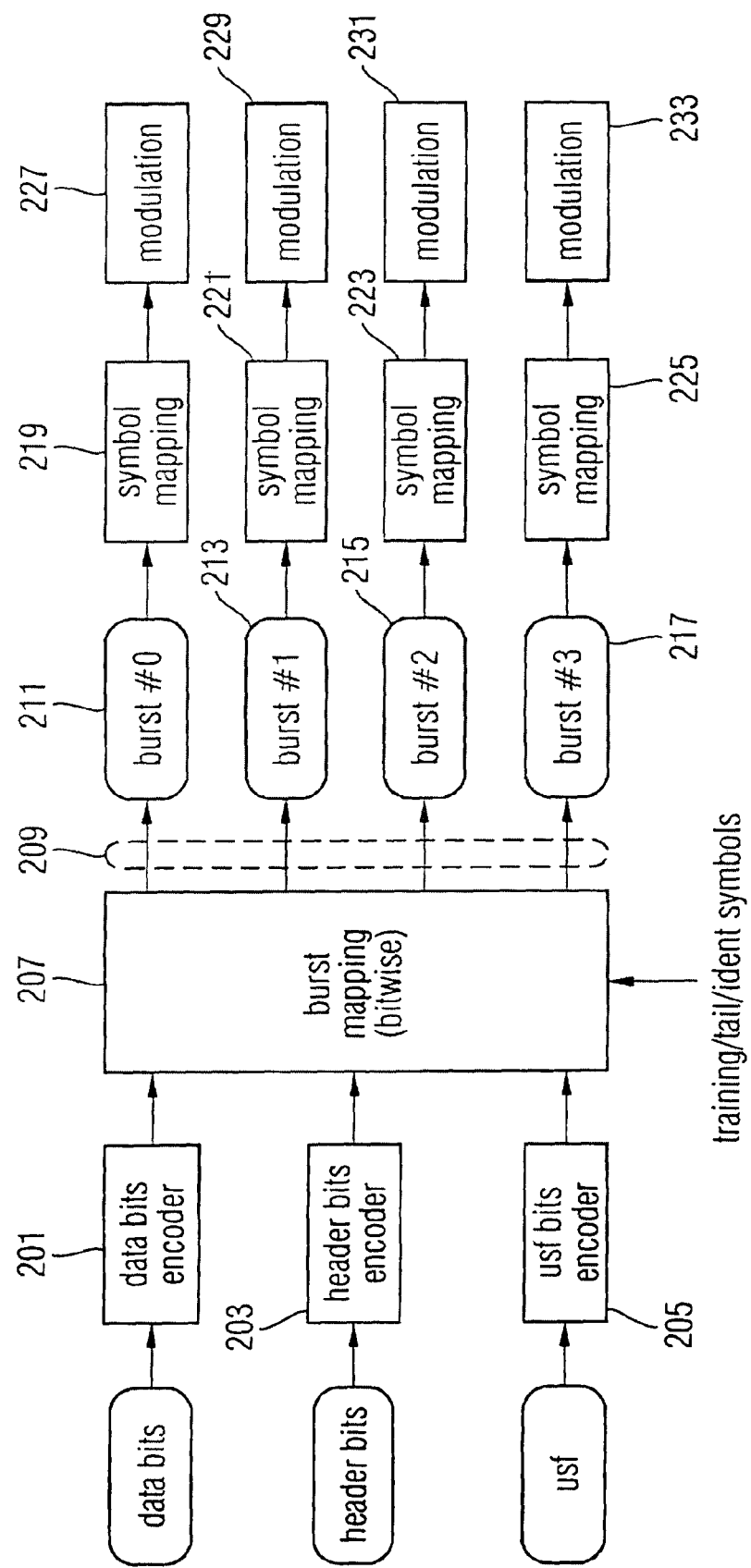

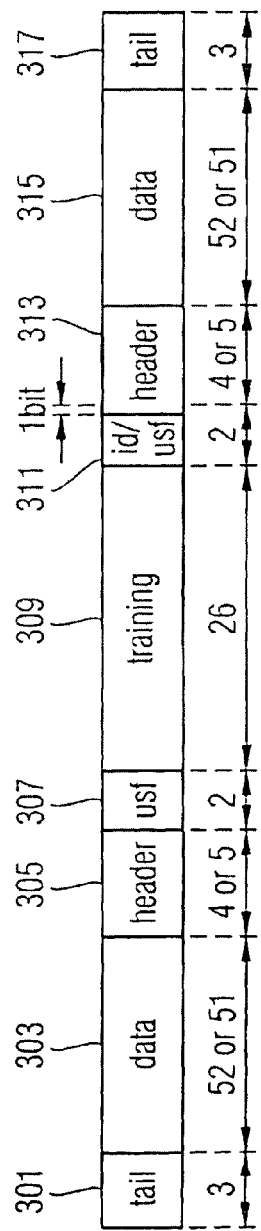
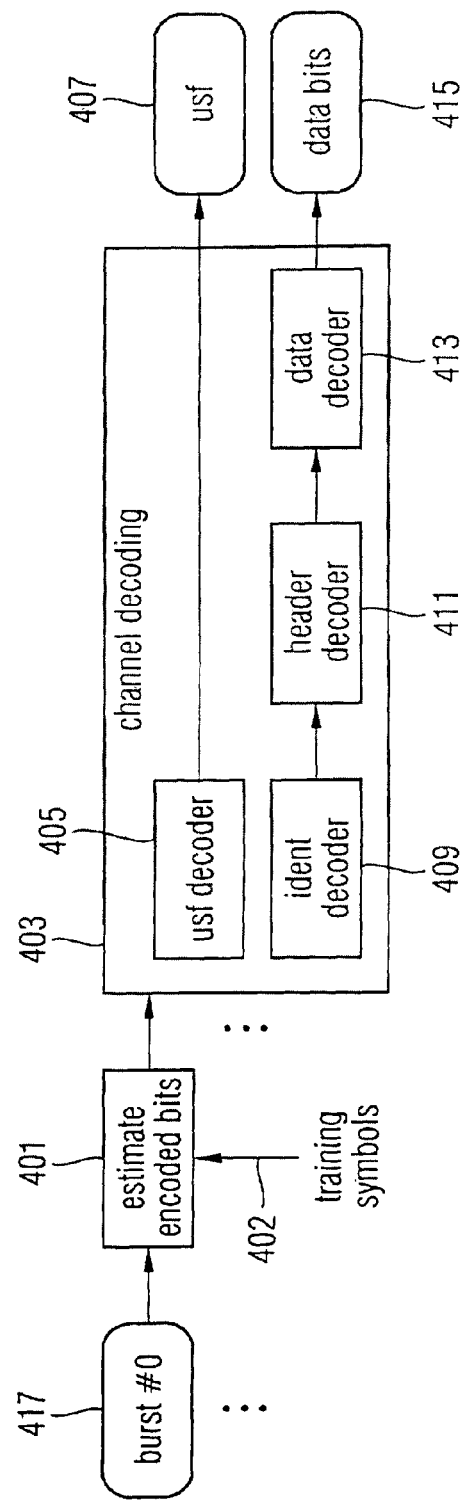

FIG 6

| m | k | | ⌈3m/2-k/4⌋ | phase bias [degree] | unbiased phase error |
|---|---|---|---|---|---|
| even | even | k/2 is even | 3m/2-k/4 | 0.00 | 3.75 |
| odd | even | k/2 is odd | | | -3.75 |
| even | odd | (k+1)/2 is odd | 3m/2-(k-1)/4 | 7.50 | 11.25 |
| odd | odd | (k+1)/2 is even | | | 3.75 |
| even | even | k/2 is odd | 3m/2-(k+2)/4 | -15.00 | -11.25 |
| odd | even | k/2 is even | 3m/2-(k-2)/4 | 15.00 | 11.25 |
| even | odd | (k+1)/2 is even | 3m/2-(k+1)/4 | -7.50 | -3.75 |
| odd | odd | (k+1)/2 is odd | | | -11.25 |
| | | | average phase bias/error | -3.75 | 0.00 |
| | | | | 3.75 | |

TRANSMITTER FOR COMMUNICATION SYSTEMS EMPLOYING AN ENHANCED MODULATION SCHEME

REFERENCE TO RELATED APPLICATIONS

This application claims the benefit of the priority date of European application 07002011.0, filed on Jan. 30, 2007, the contents of which are herein incorporated by reference in their entirety.

FIELD OF THE INVENTION

The present invention relates to a transmitter for communication systems employing an enhanced modulation scheme and more specifically to downward compatibility in communication systems.

BACKGROUND OF THE INVENTION

Data communication systems undergo a continuing evolution towards higher data rates. One possibility to increase the data rate of a communication system is to implement a higher-order modulation scheme.

The implementation of a higher-order modulation scheme generally excludes legacy terminals using previous modulation techniques from participation in the enhanced communication system. This may result in network segregation.

As an example, the evolution of GSM (Global System for Mobile Communications) towards EGPRS (Enhanced General Packet Radio Service) was accompanied by the implementation of an 8-PSK (Phase Shift Keying) modulation scheme. As a consequence, GSM mobile stations that did not support EGPRS, i.e. which only used GMSK (Gaussian Minimum Shift Keying) which is a binary modulation scheme, could not decode any data dedicated to an EGPRS mobile station.

Based on the above, there is a need in the art for a transmitter that transmits a signal that is at least partially to be processed by a legacy terminal.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

According to one embodiment of the invention, a transmitter for transmitting a transmit signal modulated according to a first modulation scheme is provided. The first modulation scheme is associated with a set of first constellation points. The transmitter transmits at least a part of the transmit signal upon a basis of only a subset of first constellation points. First constellation points of the subset of first constellation points approximate second constellation points of a set of second constellation points associated with a second modulation scheme, the second modulation scheme being different from the first modulation scheme. Thus, in the transmitter, the transmitted data is processed such that terminals using only the second modulation scheme for decoding may still decode at least a part of the transmitted data. Consequently, such terminals are not completely excluded from participation in a communication network employing the first modulation scheme.

In one embodiment, the part of the transmitted data which can be decoded by the terminals using only the second modulation scheme represents an uplink state flag and/or a training sequence and/or a tail sequence and/or a modulation scheme identification within the transmit signal format. Then, at least information associated with these data parts contained in the transmit signal format (e.g. a burst) is available to the terminals which do not use the first modulation scheme.

In one embodiment, a second constellation point from the set of second constellation points is approximated by a first constellation point from the subset of first constellation points if a distance between the second constellation point and the first constellation point is less than or equal to the differences between the second constellation point and all other first constellation points of the set of first constellation points. This criterion provides for an efficient choice of a subset of first constellation points.

In one embodiment, the first modulation scheme is a higher order modulation scheme than the second modulation scheme. In this case but also in other cases, all constellation points associated with the second modulation scheme may be approximated by the subset of first constellation points, if desired.

According to another embodiment of the invention, a communication system comprises a transmitter and a receiver, wherein the transmitter transmits a transmit signal modulated according to a first modulation scheme. The first modulation scheme is associated with a set of first constellation points. The receiver employs a demodulation scheme associated with a second modulation scheme. The second modulation scheme is associated with a set of second constellation points and is different from the first modulation scheme. The transmitter transmits at least a part of the transmit signal upon a basis of only a subset of first constellation points, wherein the first constellation points of the subset of first constellation points approximate second constellation points of the set of second constellation points. As terminals using only the second modulation scheme for decoding may still decode at least a part of the transmitted data, segregation of the communication system may be avoided.

According to still another embodiment of the invention, an apparatus is configured to map second groups of bits of an input bit stream to first groups of bits of an output bit stream. Each first group of bits is associated with a first constellation point according to a first modulation scheme and each second group of bits is associated with a second constellation point according to a second modulation scheme. The apparatus comprises a determination unit that is adapted to determine for each second group of bits a first group of bits, wherein the first group of bits represents a first constellation point approximating the second constellation point. Thus, as the first group of bits is associated to a first constellation point "near" to the second constellation point associated with the second group of bits, any system adapted to process second constellation points may equally be able to process the first constellation points.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

Embodiments of the invention will be described by way of example with respect to the accompanying figures, in which:

FIG. 2 shows a block diagram of a system for processing a bit sequence in a transmitter according to one embodiment of the invention;

FIG. 3 shows a data burst;

FIG. 4 shows a block diagram of a detector according to one embodiment of the invention;

FIG. 6 shows a look-up table;

DETAILED DESCRIPTION OF THE INVENTION

A communication network has been evolved towards higher data rates by implementing an enhanced (typically higher-order) modulation scheme. Enhanced terminals (receivers) demodulating received data according to the enhanced modulation scheme can decode all transmitted data. According to one embodiment, the data is transmitted such that legacy terminals using only the precursor modulation scheme (denoted as legacy modulation scheme in the following) for decoding may still decode at least a part of the transmitted data. Thus, legacy terminals are not completely excluded from participation in the communication network employing the enhanced modulation scheme. For instance, the first and/or the second modulation schemes may be linear quadrature amplitude or phase shift keying modulation schemes.

Figure 8:
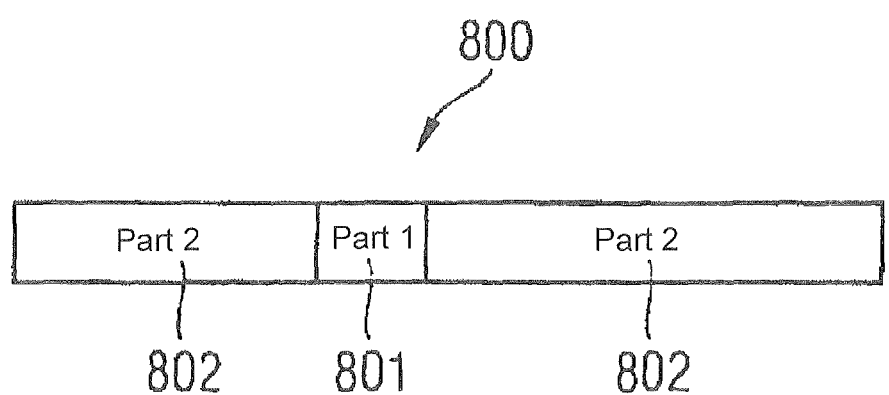
FIG. 8 shows a data format structure comprising multiple data parts.

FIG. 8 shows a data format structure 800 used in the communication network. The data format structure 800 may be a TDMA (Time Division Multiple Access) data structure, e.g. a data burst or a data frame. As is known in the art, a transmitter for transmitting data to a receiver typically arranges the data stream to be transmitted in such pre-defined data format structures 800. The data format structure 800 is usually stipulated in a communication standard underlying the communication network.

The data stream to be transmitted may be described by a sequence of symbols t(B,k) associated with the enhanced modulation scheme. In this representation, B is a consecutive number indexing the data format structure (e.g. burst number) and k is a consecutive number indexing a symbol within the data format structure (i.e. symbol number).

The data format structure 800 comprises at least two data parts 801 and 802. Enhanced and legacy terminals shall be able to decode part 801. Part 802 can only be decoded by enhanced terminals.

This is achieved by using in the transmitter only a subset of symbols of the enhanced modulation scheme for the part 801. This subset of symbols is chosen in a way that the legacy station can successfully decode data format structure part 801. The residual part(s) 802 may use all symbols comprised by the enhanced modulation scheme.

The symbols used for part 801 of the data format structure 800 are denoted by t(B,k), k ∈ D, where D represents the set of indices k of symbols within part 801 of the data format structure 800.

According to one aspect, these symbols t(B,k), k ∈ D, may obey the following rule $$N_0(s(B,k),t(B,k),k) \leq N_0(s(B,k),t',k)$$

for all symbols t' associated with the enhanced (e.g. higher-order) modulation scheme. Here, s(B,k) is a symbol associated with the legacy modulation scheme that can be decoded by the legacy terminal and $N_0(s,t,k)$ is a suitable norm.

The smaller $N_0(s,t,k)$ the better the legacy terminal can decode part 801 of the data format structure 800. For instance, the norm $N_0(s,t,k)$ may be defined by $$N_0(s,t,k) = N_1(s \cdot \exp(j[k-k_1]\psi) - t \cdot \exp(j[k-k_2]\phi)),$$

where $N_1$ is a norm depending on a complex quantity, $\psi$ is an angle by which the legacy modulation alphabet is rotated and $\phi$ is an angle by which the enhanced modulation alphabet is rotated. $k_1$ and $k_2$ are indices relating to corresponding symbols in corresponding data format structures, for example, $k_1 = k_2 = 0$. As it is apparent from the above expression, the symbol-wise rotation of the constellation points associated with the respective modulation symbol alphabet is considered in this criterion.

For instance, $N_1(s-t) = |s-t|$ (Euclidian Norm).

Further, it is also possible that a constellation point of the enhanced modulation scheme may sufficiently approximate a constellation point of the legacy modulation scheme if a distance between the first constellation point and the second constellation point is smaller than a predetermined threshold value. According to this criterion, there may exist a plurality of subsets of constellation points of the enhanced modulation scheme appropriate for approximating the constellation points of the legacy modulation scheme. Nevertheless, by choosing an appropriate (i.e. sufficiently small) threshold value, the criterion may guarantee that each subset of constellation points fulfilling the criterion could be used for modulating the specific part 801 of the data format structure according to the enhanced modulation scheme.

The term "distance" between constellation points may refer to various definitions of a norm, for instance definitions which predominantly or exclusively relate to a difference of phases between the constellation points according to one embodiment.

In other words, certain constellation points associated with a legacy modulation scheme used by e.g. a mobile station may be close enough to or even coincide with certain constellation points associated with an enhanced modulation scheme used e.g. by another mobile station or by a base station. Thus, a bit sequence modulated by the enhanced modulation scheme using the certain modulation points may by retrieved on a basis of a demodulation scheme relying on the legacy modulation scheme.

As a consequence, a plurality of modulation and coding schemes (e.g. 32-ary schemes, 16-ary schemes, 8-ary schemes, QAM, PSK) may co-exist within a communication network without the necessity of segregating the same. For example, mobile stations employing 8-PSK demodulation may successful detect data bit sequences modulated on the basis of a higher-order modulation scheme (e.g. 16-ary or 32-ary), so that these mobile stations may further participate in the network employing the higher-order modulation scheme, e.g. future GERAN networks (GERAN=GSM/EDGE Radio Access Network) networks.

In the following, the embodiments are mainly illustrated in the context of future GERAN evolution networks. However, it is to be understood that the invention is not limited to GERAN evolution networks. Furthermore, it is not even limited to wireless communication systems but may be implemented basically in all data communication systems.

As an example, the legacy modulation format is 8-PSK. The enhanced modulation format may for instance be a 16-ary modulation scheme as will be used in future GERAN evolution networks. Legacy terminals (i.e. mobile stations) are assumed to be compliant with the standard 3GPP GERAN Rel-6 (Release 6) or earlier release and support EGPRS.

In order to digitally modulate a data sequence, a number of bits representing the data sequence are mapped onto one or more of constellation points selected from a plurality of constellation points associated with the underlying modulation scheme. For example, 16-ary modulation schemes comprise 16 constellation points so that four successive bits may be mapped onto a particular constellation point assigned to four successive bits. In 8-PSK, three bits are mapped to each 8-PSK constellation point.

In one embodiment digital modulation approaches may be applied for modulation and encoding as in the case of turbo-coding schemes. Turbo-coding combined with a 16-ary modulation scheme is a possible processing scheme for future GERAN evolution networks. In GERAN, the specification of turbo-coding combined with the 16-ary modulation scheme is currently in progress. In this context, several proposals regarding coding of the data bits exist. No solution of this problem is defined so far.

Further building blocks are not fully specified in GERAN, among other things signal constellation, burst structure and backwards compatibility.

With respect to signal constellation, e.g. the following approaches are possible:
square $\pi/4$-16-QAM (Quadrature Amplitude Modulation) constellation,
circular $5\pi/12$-(12,4)-APK (R=1.5, 2) constellation (APK=Amplitude Phase Keying), and
circular $3\pi/8$-(8,8)-APK constellation (R=1.5).

Figure 1C:
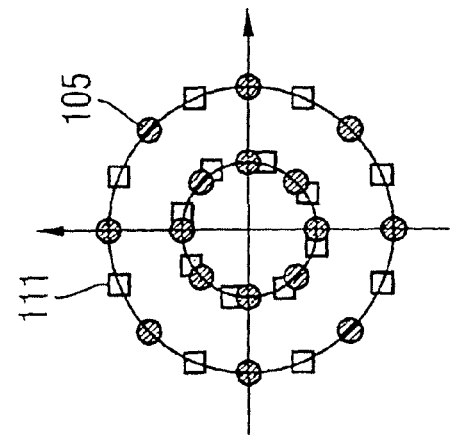
FIG. 1c shows constellation points for (8,8)-APK modulation.
Figure 1B:
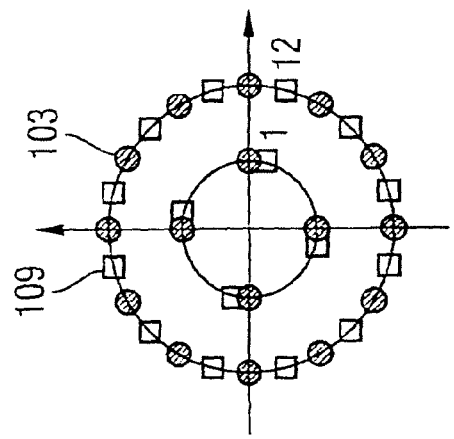
FIG. 1b shows constellation points for (12,4)-APK modulation.
Figure 1A:
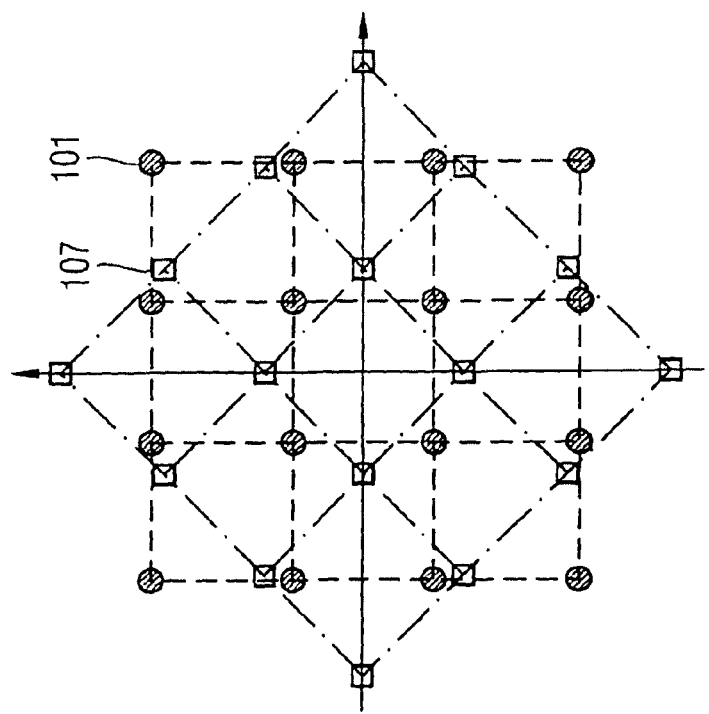
FIG. 1a shows constellation points for 16-QAM.

The above-mentioned 16-ary constellations are shown in FIGS. 1a, 1b and 1c, respectively. The constellation points 101, 103 and 105 which are represented by the black dots are associated with a constellation for a first symbol. The constellation points 107, 109 and 111 being represented by the squares are associated with a second, rotated symbol.

Typically, the rotation angle is $\pi/4$ for 16-QAM, $5\pi/12$ for (12,4)-APK and $3\pi/8$ for (8,8)-APK. In case of 16-QAM and (8,8)-APK, the constellation for all odd-indexed symbols is the same. The same is true for all even-indexed symbols. In case of (12,4)-APK, the constellation is repeated after 6 rotations.

Usually, some constellations are associated with a reduced bit error rate of the receiver while other constellations provide for an improved peak-to-average ratio.

With respect to burst structure, some open issues relate to training symbols, the stealing symbols and to the USF (Uplink State Flag) symbols.

A major open issue is related to the backwards compatibility of an enhanced network (e.g. GERAN Release 7) to legacy mobile stations (e.g. GERAN Release 6).

Enhanced data services are usually provided in packet switched mode. In this mode, the mobile station listens to bursts dedicated to other terminals to detect the USF. The USF is a small piece of information that informs the mobile station whether it shall transmit during a certain time slot or not. Even if the data bits are dedicated to a different mobile station, any mobile station should be able to decode the USF of this block.

Typically, a legacy mobile station cannot decode any piece of information of radio blocks that are modulated and encoded in the new 16-ary modulation scheme, since the legacy mobile stations can only handle GMSK and 8-PSK modulation. Consequently, legacy mobile stations will not receive any USF information as long as the network allocates another mobile station using the 16-ary modulation scheme. Therefore, the data service for legacy mobile stations will either be significantly degraded or the GERAN network must segregate legacy mobile stations.

An analog situation is experienced in all data communication systems advancing to higher-order modulation schemes. The legacy terminals cannot decode data modulated in the higher-order modulation scheme. In other words: Higher-order modulation schemes generally lack downward compatibility. As a consequence, a network advancing to a higher-order modulation scheme may need to be segregated.

As another example, a similar problem exists for EGPRS. EGPRS uses GMSK and 8-PSK modulation. Thus, mobile stations which do not support EGPRS cannot decode the USF if the data signals are dedicated to an EGPRS mobile station using 8-PSK. Again, this problem may be overcome by segregation of the network which is, however, associated with an increased complexity of the network.

FIG. 2 shows a block diagram of a system for channel encoding and modulation of a radio data block. This system is used for EGPRS channel encoding and is also valid for the new 16-ary modulation schemes used in GERAN evolution networks.

The system comprises a data bits encoder 201 (e.g. a channel encoder) for encoding data bits, a header bits encoder 203 for encoding header bits and a USF bits encoder 205 for encoding USF bits. Each encoder 201, 203, 205 has an output coupled to a burst mapping block 207. The burst mapping block 207 has a number of outputs 209 for providing the number of bursts 211, 213, 215 and 217 to symbol mapping blocks 219, 221, 223 and 225, respectively. Each of the symbol mapping blocks 219, 221, 223 and 225 has an output coupled to an input of a respective modulator 227, 229, 231 and 233. It is assumed that the system shown in FIG. 2 uses a first modulation scheme, (e.g. 16-QAM, (12,4)-APK, (8,8)-APK) or 32-QAM). The data bits, header bits and USF bits are thus encoded and grouped in the data bits encoder 201, the header bits encoder 203 and the USF bits encoder 205 according to the enhanced modulation scheme. For example, if a 16-ary modulation scheme is used, a group of 4 bits output from the data bits encoder 201, the header bits encoder 203 and the USF bits encoder 205 relate to one symbol, respectively.

The data bits encoder 201 and the header bits encoder 203 may generate such symbol-related bit groups according to conventional techniques used for bit encoding in devices employing the enhanced (e.g. 16-ary) modulation schemes. The USF bits are encoded and grouped also according to the enhanced modulation scheme. However, only bit groups associated with a subset of symbols of the first modulation scheme are allowed to be generated by the USF bits encoder 205.

Analogously, other parts of the burst, e.g. training bits and/or tail bits and/or identification (ident) bits may be encoded the same way as the USF bits, i.e. on the basis of dedicated bit groups associated with only a part (subset) of the symbols of the entire symbol alphabet of the enhanced modulation scheme. In this case, encoded bit groups relating to training symbols, tail symbols or identification symbols (ident) may be provided via separate inputs to the burst mapping block 207.

As depicted in FIG. 2, the burst mapping block 207 may be configured for parallel processing in one embodiment in order to assemble a plurality of bursts #0 to #3 from the received data streams of grouped bits.

In one embodiment the symbol mapping blocks 219, 221, 223 and 225 map the respectively grouped bits onto constellation points which are provided to the modulators (or mixers) 227, 229, 231 and 233 for e.g. filtering and up-conversion.

As displayed in FIG. 2, the burst mapping block 207 may be configured for bit-wise mapping in one embodiment. In this case, the mapping on a burst is performed bit-wise, wherein the bits are mapped onto symbols before modulation. An equivalent description that is also contemplated is a symbol-wise burst mapping. In this case, symbol mapping would be performed upstream of burst mapping. In both cases (bit-wise or symbol-wise burst mapping), the rotation of the constellation points is done after burst mapping.

The system shown in FIG. 2 may be employed for generating an EGPRS channel encoding block for a radio signal and may also be employed for the newly arising 16-ary modulation and coding schemes in connection with the GERAN-evolution network. It may be also employed in other communication standards, for instance future communication standards which may use still higher-order modulation schemes, e.g. 32-ary modulation schemes.

The symbol-wise burst mapping approach for the example of 8-PSK modulation is demonstrated as one embodiment in FIG. 3 showing a data burst comprising a first tail burst 301, a first data burst 303, a header burst 305, a USF burst 307, a training burst 309, an ID/USF burst 311, a header burst 313, a second data burst 315, and a second tail burst 317. In terms of symbols, the burst mapping is quite similar for GMSK and 8-PSK modulation. In GMSK modulation, each symbol represents 1 bit. In 8-PSK modulation, each symbol represents 3 bits, wherein in the case of a 16-ary modulation each symbol represents 4 bits, by way of example.

As shown in FIG. 3, 26 pre-defined training symbols s(B, 61), ..., s(B,86) are placed into the center of the burst s(B,k) (B=0, 1, 2, 3, k=0, ..., 147) of one radio block. The tail symbols s(B,0), s(B,1), s(B,2), s(B,145), s(B,146) and s(B, 147) may always be set to +1. The symbols following the training symbols include USF or identification bits: s(B,59), s(B,40), s(B,87) and s(B,88). One bit of the symbol s(B,88) is a header bit, i.e. it is not part of the overhead bits. Therefore, this symbol can have two different values for the same USF information which, however, does not have any impact on the inventive scheme.

The indices of these symbols may comprise a set $$D=\{k: s(B,k) \text{ determined by training sequence, identification, USF or tail bits}\}.$$

FIG. 4 shows a block diagram of a receiver of a legacy mobile station supporting EGPRS. The receiver comprises an estimation block 401 for estimating encoded bits using training symbols provided via an input 402 to the block 401. An output of the channel estimating block 401 is coupled to a channel decoding block 403. The channel decoding block 403 comprises a USF decoder 405 providing the decoded USF bits 407. The channel decoding block 403 further comprises, in one embodiment, an identification decoder 409, a header decoder 411 arranged after the identification decoder 409 and a data decoder 413 arranged after the header decoder 411. The USF bits 407 and the data bits 415 are provided from a burst 417 (burst #0).

The legacy mobile station first detects the modulation type and then estimates all bits of a burst. If the received bursts are 8-PSK modulated, then the USF bits and the identification bits may be decoded from the received USF signal and the received identification signal, respectively. The decoded USF bits are used to control the uplink transmission. The decoded identification bits are used to distinguish the 8-PSK modulated coding schemes MCS-5 and MCS-6 from MCS-7, MCS-8 and MCS-9. Then, the header is decoded, from which the coding scheme is read. Subsequently, the data bits are decoded.

When a new 16-ary modulated burst is used, basically, only the training bits and the USF bits may be "detectable" in a legacy mobile station, whereas the identification bits, tail bits, header bits and the data bits do not need to be successfully decoded. However, since many various implementations of the mobile station receiver exist, it may be desirable that also the tail bits or all symbols of the aforementioned set D should be "detectable". "Detectable" means that these symbols are the same or at least very similar for 8-PSK and 16-ary modulated radio blocks.

According to one embodiment, the 16-ary symbols which are detectable using e.g. an 8-PSK scheme may be chosen from one of the following modulation alphabets:

$$A=\{\pm 1 \pm j, \pm 1 \pm 3j, \pm 3 \pm j, \pm 3 \pm 3j\} \text{ for 16-QAM},$$

$$A=\{(\pm 1 \pm j), R\exp(jm\pi/6): m=0, \ldots, 11\} \text{ for (12,4)-APK},$$

$$A=\{\exp(jm\pi/8), R\cdot\exp(jm\pi/8): m=0, \ldots, 7\} \text{ for (8,8)-APK}.$$

These symbols may by rotated by $a^k=\exp(jk\phi)$ ($\phi=\pi/4$ for 16-QAM, $\phi=5\pi/12$ for (12,4)-APK and $\phi=3\pi/8$ for (8,8)-APK). A 16-ary modulated burst is then given by $a^k \cdot t(B,k)$, where $t(B,k) \in A$.

Moreover, these symbols may be scaled and/or rotated by a common complex factor. Such a factor could be handled in a straightforward way in the following steps. For the sake of simplicity, this is not addressed explicitly.

The 16-ary symbols $t(B,k)$ may be chosen so that $$t(B,k) = \arg\min_{t'} \{|s(B,k)\exp(j3\pi/8) - \alpha t'(B,k)| : t'(B,k) \in A\}$$

for $k \in D$. The minimization may include a complex scaling factor $\alpha$, which should have the same value for all B and k, for example for a gain and phase compensation. For the other positions, i.e. for header and data information, the bits can be freely chosen.

The rotation by $3\pi/8$ corresponds to a rotation which is performed with respect to the 8-PSK modulation scheme. Thus, the subset of 16-ary symbols (certain constellation points) may be chosen such that they approximate rotated 8-PSK symbols (constellation points).

As mentioned before, in case of the 8-PSK modulation format, one bit of the symbol s(B,88) is not a USF bit but a header bit. Therefore, two possible symbol values represent the same USF information.

The following example shall illustrate this degree of freedom. The USF information bits are (0,1,0). Symbol s(0,88) contains the bits (1,0) and a coded header bit. If the coded header bit is 0, the symbol is (1,0,0)→−j. If the coded header bit is 1, the symbol is (1,0,1)→−(1+j)/√2. Consequently, the legacy station can decode the USF best, when $t(0,88) \approx -j$ or $t(0,88) \approx -(1+j)/\sqrt{2}$.

Consequently, the rule for the 16-ary symbol t(B,88) is $$t(B,88)=\text{argmin}_{t'}\{|s_h(B,88)\exp(j3\pi/8)-\alpha t'(B,88)|: t'(B,88) \in A, \alpha>0, h=0,1\}$$

where h=0, 1 is the header bit and $s_h$(B,88) is the symbol as a function of the header bit. In all cases where several identical minima occur, a free choice is specified.

Figure 5:
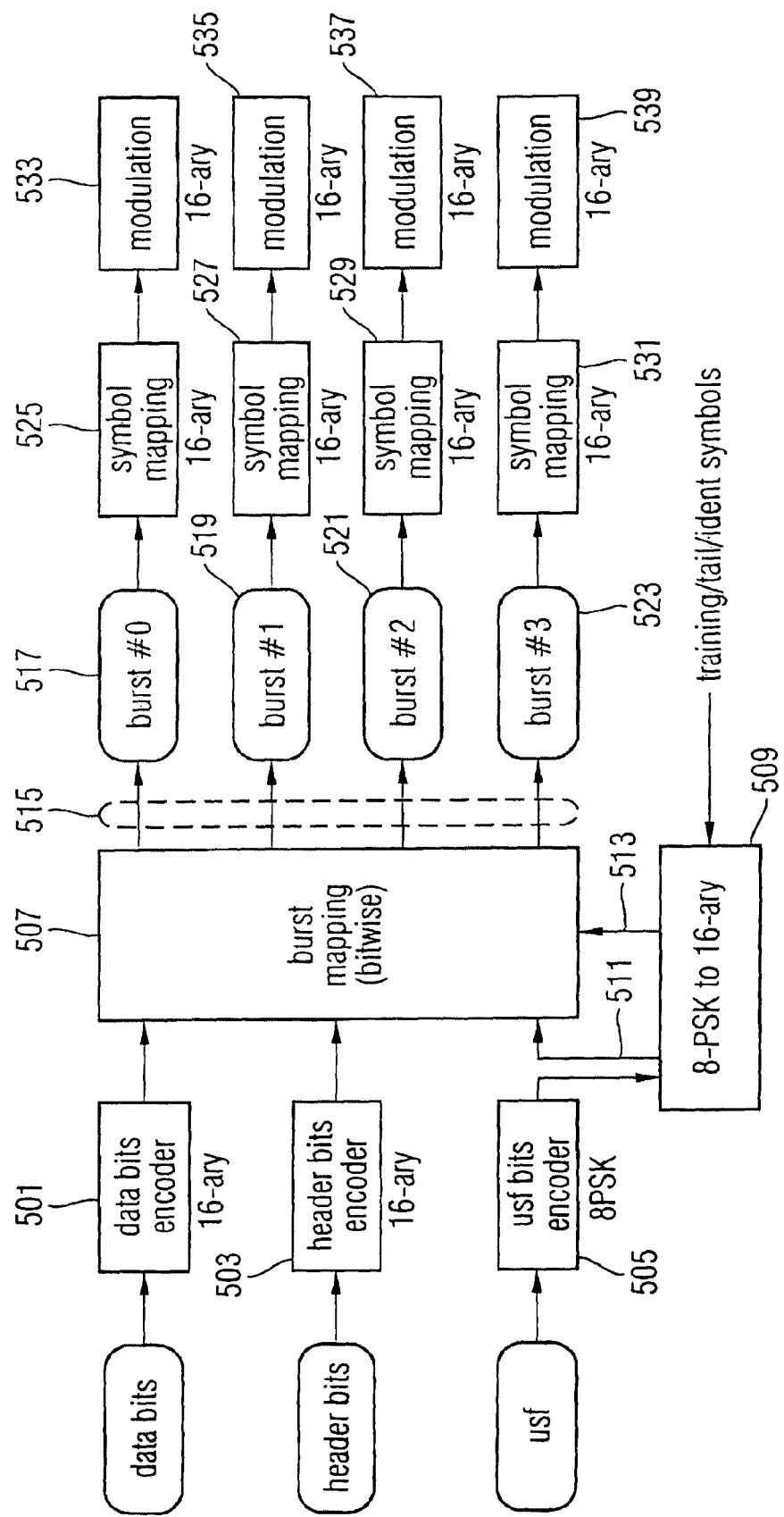
FIG. 5 shows a block diagram of a system for processing a bit sequence in a transmitter according to one embodiment of the invention.

FIG. 5 shows a block diagram of a system for processing bit sequences according to another embodiment of the invention. The system in FIG. 5 mainly distinguishes from the system illustrated in FIG. 2 in that the symbols t(B,k) with k ∈ D of the enhanced modulation scheme (e.g. 16-ary symbols) are mapped from given symbols of the legacy modulation scheme (e.g. 8-PSK symbols).

More specifically, the system shown in FIG. 5 comprises a data bits encoder 501, a header bits encoder 503 and a USF bits encoder 505. The outputs of the data bits encoder 501 and the header bits encoder 503 are coupled to corresponding inputs of a burst mapping block 507, respectively.

An output of the USF bits encoder 505 is coupled to an apparatus 509 for processing a data sequence according to an embodiment of the invention. The apparatus 509 has outputs 511 and 513 coupled to respective inputs of the burst mapping block 507. Block 505 in combination with apparatus 509 provide for 16-ary USF bit encoding.

The apparatus 509 may have inputs for optionally receiving training, tail or identification symbols which also may be processed such that these bits are mapped onto corresponding bits associated with the enhanced modulation scheme.

The burst mapping block 507 has a number of outputs 515 for providing bursts 517, 519, 521 and 523 to respective symbol mapping blocks 525, 527, 529 and 531. Each of the symbol mapping blocks 525 to 531 has an output connected to an input of a respective modulator 533, 535, 537 and 539.

The data bits encoder 501 and the header bits encoder 503 receive data bits and header bits, respectively, and provide data sequences to the burst mapping block 507 in accordance with the enhanced modulation scheme (e.g. 16-ary mapping).

The USF bits encoder 505 encodes and groups the USF bits according to the legacy modulation scheme (e.g. 8-PSK). The apparatus 509 maps the grouped USF bits (e.g. 3 bits per group) onto another group of bits (e.g. 4 bits per group) associated with the subset of symbols of the enhanced modulation scheme which approximate the symbols of the legacy modulation scheme in accordance with the foregoing description. Optionally, the apparatus 509 may perform the same operation with respect to bit groups associated with the training, tail or identification symbols. In one embodiment the apparatus 509 may comprise one or more look-up tables which are used for mapping of the bit groups.

The other elements in FIG. 5 correspond in one embodiment to the elements of the system of FIG. 2. Moreover, the parallel structure of the system of FIG. 5 may be replaced by a serial structure as already discussed with respect to the system illustrated in FIG. 2.

In one embodiment the legacy symbol to higher-order symbol mapping (8-PSK to 16-ary mapping) may be performed using a look-up table in which certain 16-ary constellation points are associated with certain 8-PSK constellation points so that these certain 16-ary constellation points best approximating the 8-PSK constellation points may efficiently be determined. As constellation points are mapped, the sample-wise rotation of the constellation is considered. Thus, a 4-bit group associated with a 16-ary constellation point may be retrieved in the look-up table on the basis of the input 3-bit group and a consecutive number indexing each 3-bit group. Generally speaking, a bit group associated with a constellation point of the enhanced modulation scheme may be retrieved in the look-up table on the basis of a bit group associated with a constellation point of the legacy modulation scheme and a consecutive number indexing such each bit group.

In the case of (8,8)-APK for the 16-ary modulation scheme, the sample-wise rotation is identical for 8-PSK and the 16-ary modulation. Therefore, the same phase can be chosen for both modulation schemes. For the sake of power efficiency, the outer symbols may be chosen:

$$s(B,k)=\exp(jm\pi/4) \to t(B,k)=R\cdot\exp(jm\pi/4).$$

Thus, in the case of (8,8)-APK, the 16-ary symbols and the 8-PSK symbols only differ by a linear scale, namely radius R.

In the case of (12,4)-APK for the 16-ary modulation scheme, the rotation difference is exp(+jk5π/12) exp(−jk3π/8)=exp(+jkπ/24). The mapping considers the 8-PSK symbol value index m, m=0, 1, . . . , 7 and the symbol consecutive number k.

$$s(B,k)=\exp(jm\pi/4) \to t(B,k)=R\cdot\exp[j\lceil 3m/2-k/4\rceil\pi/6],$$

where ⌈ . . . ⌉ means rounding towards the next integer value. In one embodiment the above-mentioned rounding is specified in a table as shown in FIG. 6. This table may be implemented as a look-up table for providing for any values of m and k the associated (12,4)-APK constellation t(B,k)

In the right part, the table comprises four rows. In the upper row, the (12,4)-APK constellation with minimum distance to the 8-PSK symbol with symbol value index m is identical to the 8-PSK constellation. In the second and fourth row, the (12,4)-APK constellation differs by an phase error (also denoted as phase bias) of 7.5 degree and −7.5 degree, respectively. In the third row, two choices for the (12,4)-APK constellation are possible since the phase errors −15.0 degree and 15.0 degree of these two constellations have the same absolute value. The Italic style entries refer to this alternative rounding embodiment.

Summing the phase errors, it appears that the average phase error (average phase bias) is −3.75 degree or 3.75 degree for the alternative rounding embodiment. An average phase error having the absolute value 3.75 degree does not cause any problem to a legacy receiver, since it is seen as a part of a channel impulse response. The standard deviation of the phase bias is 8.4 degree.

The unbiased phase error (phase error minus average phase error) is the effective phase error seen by the mobile station. It adds an error level of approximately −16.7 dBc to the signal. Since the mobile station has to cope with a carrier-to-interferer ratio of approximately 10 dB in most scenarios, this is acceptable.

Figure 7:
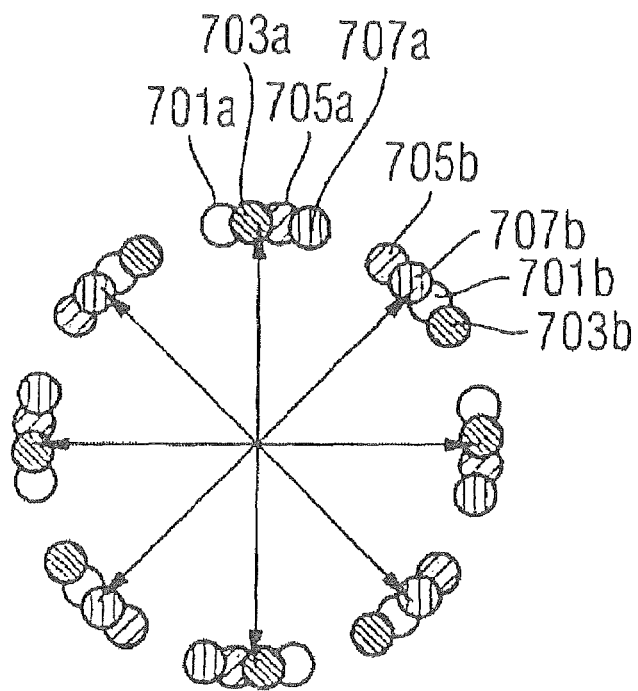
FIG. 7 shows constellation points.

FIG. 7 shows constellation points associated with the 8-PSK modulation scheme and the (12,4)-APK modulation scheme. The 8-PSK constellation points are illustrated by arrows. The circular constellation points represent approximating constellation points associated with the (12,4)-APK modulation scheme. The unbiased phase errors depicted in FIG. 7 relate to the alternative rounding embodiment (Italic style entries of the table shown in FIG. 6).

The constellation points 701a, 701b are associated with unbiased phase errors −11.25 degree and 3.75 degree, the constellation points 703a and 703b are associated with unbiased phase errors −3.75 degree and 11.25 degree, the signal constellation points 705a and 705b are associated with unbiased phase errors 3.75 degree and −11.75 and the signal constellation points 707a, 707b are associated with unbiased phase errors 11.25 degree and −3.75 degree.

Similar to symbol s(B,88) mentioned above, some proposals for 16-ary modulation and coding schemes may have symbols with USF and header and/or data bits. While not optimal, if it cannot be avoided, only a small degradation is added.

Using in the higher-order modulation format the above explained legacy symbol approximation approach, e.g. training symbols, stealing symbols, USF symbols and tail symbols may be defined in such a way that a legacy mobile station can successfully decode the stealing symbols and the USF symbols of a 16-ary modulated block. All other symbols may be chosen according to the 16-ary modulation and coding scheme for e.g. header and data information. A legacy mobile station may discard header or data bits if the header or the data bits can not successfully be decoded. The legacy mobile station (i.e. the terminal) may further report this failure to the network being aware of the legacy mobile station so that the network can handle these problems accordingly.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A transmitter configured to transmit a transmit signal modulated according to a first modulation scheme, comprising:
    an encoder configured to receive bits to be transmitted and encode the bits in accordance with the first modulation scheme,
    a symbol mapper configured: to map the encoded bits onto constellation points,
    wherein the first modulation scheme is associated with a set of first constellation points,
    wherein the transmitter is further configured to transmit at least a part of the transmit signal based on a subset of the first constellation points,
    wherein the first constellation points of the subset of the first constellation points approximate second constellation points of a set of second constellation points associated with a second modulation scheme, wherein the second modulation scheme is different from the first modulation scheme,
    wherein a second constellation point from the set of second constellation points is approximated by a first constellation point from the subset of first constellation points if a distance between the second constellation point and the first constellation point is less than or equal to the differences between the second constellation point and all other first constellation points of the set of first constellation points.

2. The transmitter of claim 1. wherein the part of the transmit signal represents a predetermined information sequence within a transmit signal format.

3. The transmitter of claim 2, wherein the transmitter is further configured to transmit further information sequences that are different from the predetermined information sequence within the transmit signal format, wherein the further information sequences utilize any first constellation point from the set of first constellation points.

4. The transmitter of claim 2, wherein the predetermined information sequence represents an uplink state flag, or a training sequence, or a tail sequence, or a modulation scheme identification within the transmit signal format.

5. The transmitter of claim 2, wherein the transmit signal format comprises a signal burst.

6. The transmitter of wherein the distance comprises the Euclidian norm.

7. The transmitter of claim 1, wherein the find modulation scheme is a higher-order modulation format than the second modulation scheme.

8. The transmitter of claim 1, Wherein the first modulation scheme comprises a linear quadrature amplitude modulation scheme.

9. The transmitter of claim 1, wherein the at least a part of the transmit signal comprises an uplink state flag, a training sequence, or a tail sequence.

10. A communication system comprising a transmitter and a receiver, wherein:
    the transmitter is configured to transmit a transmit signal modulated according to a first modulation scheme, wherein the first modulation scheme is associated with a set of first constellation points,
    the receiver is configured to employ a demodulation scheme associated with a second modulation scheme, the second modulation scheme being associated with a set of second constellation points,
    the transmitter is configured to transmit at least a part of the transmit signal based on a subset of first constellation points, wherein the first constellation points of the subset of first constellation points approximate second constellation points of the set of second constellation points, and wherein the second modulation scheme being different from the first modulation scheme,
    wherein a second constellation point from the set of second constellation points is approximated by a first constellation point from the subset of first constellation points if a distance between the second constellation point and the first constellation point is less than or equal to the differences between the second constellation point and all other first constellation points of the set of first constellation points.

11. The communication system of claim 10, wherein the part of the transmit signal represents a predetermined information sequence within a transmit signal format.

12. The communication system of claim 11, wherein the transmitter is further configured to transmit further information sequences that are different from the predetermined information sequence within the transmit signal format utilizing any first constellation point from the set of first constellation points.

13. The communication system of claim 11, wherein the predetermined information sequence represents an uplink state flag, or a training sequence, or a tail sequence, or a modulation scheme identification within the transmit signal format.

14. The communication system of claim 10, wherein the distance comprises the Euclidian norm.

15. The communication system of claim 10, wherein the at least a part of the transmit signal comprises an uplink state flag, a training sequence, or a tail sequence.

16. A method for transmitting a transmit signal modulated according to a first modulation scheme, the first modulation scheme being associated with a set of first constellation points, comprising:
preparing to transmit data according to a transmit signal format; and
transmitting at least a part of the transmit signal based on a subset of first constellation points, the first constellation points of the subset of first constellation points approximating second constellation points of a set of second constellation points associated with a second modulation scheme, wherein the second modulation scheme is different from the first modulation scheme,
wherein a second constellation point from the set of second constellation points is approximated by a first constellation point from the subset of first constellation points if a distance between the second constellation point and the first constellation point is less than or equal to the differences between the second constellation point and all other first constellation points of the set of first constellation points.

17. The method of claim 16, wherein the part of the transmit signal represents a predetermined information sequence within the transmit signal format.

18. The method of claim 17, further comprising:
transmitting further information sequences that are different from the predetermined information sequence within the transmit signal format utilizing any first constellation point from the set of first constellation points.

19. The method of claim 16, wherein the at least a part of the transmit signal comprises an uplink state flag, a training sequence, or a tail sequence.

* * * * *